UNITED STATES PATENT OFFICE.

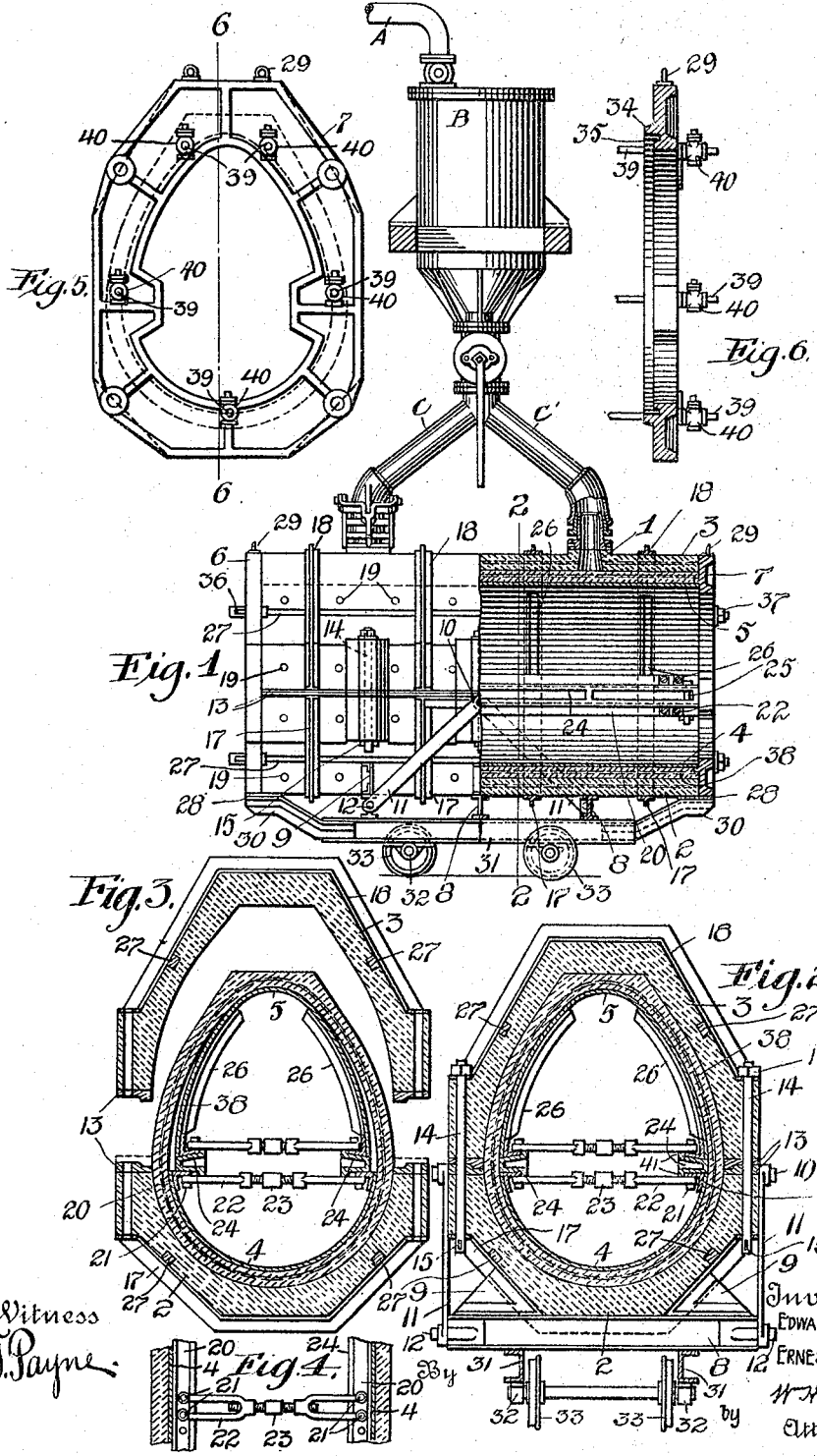

EDWARD GILES STONE AND ERNEST JOSHUA SIDDELEY, OF SYDNEY, NEW SOUTH WALES, AUSTRALIA.

MOLD.

1,212,839.  Specification of Letters Patent.  Patented Jan. 16, 1917.

Original application filed March 13, 1913, Serial No. 754,006. Divided and this application filed March 18, 1915. Serial No. 15,316.

*To all whom it may concern:*

Be it known that we, EDWARD GILES STONE and ERNEST JOSHUA SIDDELEY, citizens of the Commonwealth of Australia, residing at Sydney, in the State of New South Wales and Commonwealth of Australia, have invented certain new and useful Improvements in Molds, of which the following is a specification.

This is a division of our application Serial No. 754,006 filed March 13th, 1913.

The invention herein described relates to molds of the flexible, knock-down core type for molding pipes and like hollow objects from cement, concrete and the like self setting plastic materials, the main objects being to provide a mold which can be quickly assembled, which will allow the rapid escape of air and moisture equally from all parts of the mold and from the plastic material supplied thereto under pressure, which shall be very strong and durable and have tight joints, which shall be easily movable into and out of feeding position, and which shall have means for easily uprighting the mold from its horizontal position on the transporting means to a vertical position on the ground.

Other objects are to provide easy and accurate means for positioning reinforcing material, easy means for raising and supporting the end blocks, easy means for positioning or centering the core, easy means for quickly placing and removing expanding blocks or wedges between the edges of the core, and means for forming grooves in the ends of the article molded, all of which objects, among others, are accomplished by the arrangement, construction and combination of parts to be hereinafter more fully set forth and described.

The mold is easily movable and is preferably to be used in connection with a stationary supply of plastic material fed under compressed air and is so illustrated.

In the accompanying drawings: Figure 1 represents a view of a mold embodying our invention and its transporting truck, partly in side elevation and partly in longitudinal central section; the same being in position under the supply of plastic material; Fig. 2, a vertical cross-section on line 2—2 of Fig. 1; Fig. 3, a similar view, the top section of the outer part being slightly raised and the upper section of the inner part or core being slightly crowned, the truck being omitted; Fig. 4, a detail plan view showing part of the longitudinal wedge bars and the swivel screw links to produce expansion and contraction or crowning, fragments of the inner upper molding plate or core and the molded article being likewise shown; Fig. 5, a front elevation of an end cover or block, showing also the ends of the positioning rods for reinforcing material; and Fig. 6, a vertical cross-section on line 6—6 of Fig. 5.

Referring now in detail to the drawings, A indicates the pipe, broken away, forming communication between a source of supply of compressed air, not shown, and the container or reservoir B for the plastic material to be fed through tubes or conduits C into the feed or supply openings 1 of the mold, said tubes being provided with movable parts which may be raised or lowered into close contact with the mold and secured in such position by any suitable means. Thus far the description is general, relating mainly to matter described in detail and claimed in the parent application.

The mold now described and shown in the drawings is constructed to form oviform pipes, though the invention may be employed in making a variety of hollow objects, and it is constructed as follows of six principal parts, namely, the bottom outer section 2, the top section 3, which may be constructed of reinforced concrete or made wholly of metal or other suitable material, the bottom inner section 4 and the top inner section 5 both of metal bent to the desired shape and together forming a core, and the end covers 6 and 7 which are preferably made of metal cast to the desired shape. The bottom section 2 of the mold is supported upon the transverse bearers 8 of the under carriage, and kept in position by the cradle chocks 9. Center trunnions 10 secured to the side of the mold and attached by the links 11 to pivot pins 12 attached to the transverse bearers 8 are the means used for tilting the mold when it is desired to up-end the molded article for removal. To accomplish this, one pair of the links 11 may be released from the frame and used as lifting slings. The other pair of links, being secured both to the trunnion and the frame, will move with the mold as it is being tilted. The upper outer section 3 would be seated upon the jointing pieces 13 shown in two parts held together by the vertical bolts 14 having the wedges 15 for speedy connection and detachment, and the screw-threaded nuts 16 for tightening purposes. Each half is strengthened to withstand the air pressure by the bands 17 and 18, 17 being the lower, and 18 the upper, and are pierced through with small pipes or tubes 19 to provide escape for the air and moisture during the molding operation, these pipes or tubes being located at regular intervals throughout both halves or sections 2 and 3. The bottom section 4 of the core, when placed in position, would have its jointing edges approximately the same level as the outer bottom section 2, and is provided with longitudinal stiffening reinforcing angle-iron flanges 20, to which are attached, by the pins 21, any desired number of swivel links 22, having oppositely threaded adjusting screws 23, by which the part 4 may be expanded or contracted to obtain the correct adjustment when setting out the annular space necessary to obtain the desired thickness of the article to be molded. The upper part 5 of the core is of similar construction, and is provided with similar means of contraction and expansion, and between the edges of these parts or sections 4 and 5 are inserted wedge shaped bars 24. These are secured by through pins 25 to the stiffening flanges 20 (Fig. 1) and are capable of adjustment by means of the appliances associated with the sections 4 and 5 of the core.

As a means of stiffening or reinforcing upper section 4, the ribs 26 are secured to the inner face of the metal at regular intervals, leaving a portion of the metal unstiffened, so that the collapsing or crowning operation shown in Fig. 3 may be readily accomplished by means of the flexibility of the section as a whole. The collapsing operation is simply effected by rotating the adjusting screws 23.

To complete the mold, the end covers or blocks 6 and 7 are placed in position on the points of the through bolts 27, a foot plate 28 being provided at each end of the under carriage for them to rest on. Eye bolts 29 are the means provided for lifting these covers into position. The said foot plates 28 are carried upon the extending pieces 30 attached to the longitudinal under carriage bearers 31, having axle boxes 32 for wheels 33, upon which the structure is supported for transportation. The covers are constructed as in Figs. 5 and 6, to give free admission to the attendant to operate the adjusting screws 23, and to place in position the removable parts, such as the wedges 24 and pins 25, and, upon their inner faces the projecting tongues 34 and the grooves 35 are formed, the former being used to center the core and likewise to assist in the molding of an end groove in both ends of the molded article, such being necessary in this particular kind of pipe, and the latter being used to seat the ends of the core and to prevent leakage by the use of a seating strip or packing therein. Thus the necessary concentric space is quickly and accurately obtained when these covers are seated in position, and the releasing wedges 36 and clamping screw-threaded nuts 37 fully tightened up, the mold then being in the position shown both in Figs. 1 and 2 ready to be charged. Where the reinforcing material 38 is used to strengthen the molded article, it would be placed in position before the various parts of the mold are joined together, and to keep it from coming into contact with any part of the mold and to allow of the even distribution of the material around the reinforcing material, the rods 39 are inserted through the open cocks 40, which are likewise used for withdrawing the surplus of air and moisture from the mold, and as the molding operation is taking place the rods are withdrawn. It is through the inlet passages 1 that the molding material is passed into the mold. These are connected up, when the mold has been run into this proper position, with the feeding conduits C, as shown in Fig. 1.

A distinctive feature of the wedge shaped bars 24 is the horns 41, which are constructed so as to take a seating against angle irons 20, so that while serving as stops when being placed in position, they also answer as a means for insuring their withdrawal when adjusting screws 23 are operated for the purpose of collapsing or crowning section 5 of the core.

It is well recognized that various minor changes may be made in the arrangement, construction and combination of the various elements above set forth without avoiding the spirit of our invention, of which only a preferred form has been illustrated and described, and it is our intention and desire to include all such changes and modifications within the scope of the appended claims.

Having thus described our invention, what we claim as new and desire to secure by Letters Patent is:

1. The combination of an upper mold section and a lower mold section, together making up the body of the outer shell of a mold, with two end pieces normally held against the ends of said sections to close the ends of the mold, bolts fastening said sections together and additional bolts fastening said end pieces in position, each bolt being provided at one end with a tightening nut and at the other end with a slot and transverse wedge to facilitate fastening and unfastening the aforesaid parts.

2. In combination with the sectional outer part of a mold and the sectional hollow core thereof, a pair of end pieces fitting against the ends of said outer part and said core to complete said mold and grooved to receive the ends of said core and bolts passing through said end pieces longitudinally of said mold to fasten the foregoing parts together, said bolts being provided with tightening means and with additional means for facilitating attachment and detachment.

3. A mold comprising an outer part consisting of an upper and a lower section, detachable means for securing said sections together, a core and end pieces in combination with a supporting truck receiving the lower section and links pivoted to said lower section and truck whereby said mold may be swung from its horizontal position on said truck to a vertical position on the ground.

4. A mold having trunnions, in combination with a supporting truck having lateral pivot pins and a pair of links extending from said trunnions to said pins and permitting said mold to be swung from its horizontal position on said truck to an upright position on the ground.

5. A mold having trunnions, in combination with a supporting truck having lateral pivot pins, a pair of links extending from said trunnions to said pivot pins and permitting said mold to be swung from its horizontal position on said truck to an upright position on the ground and an additional pair of links attached to said trunnions and detachably connected at their other ends to said truck, in order that they may be freed from the latter and used as handles for turning said mold into an upright position or back again into its position on the truck.

In testimony whereof, we have signed our names to this specification in the presence of two subscribing witnesses.

EDWARD GILES STONE.
ERNEST JOSHUA SIDDELEY.

Witnesses:
  JOHN JASPER STONE,
  MARY LARKIN.

Copies of this patent may be obtained for five cents each, by addressing the "Commissioner of Patents, Washington, D. C."